United States Patent
Tsugawa et al.

(10) Patent No.: US 11,702,095 B2
(45) Date of Patent: Jul. 18, 2023

(54) TRAVEL CONTROLLER AND METHOD FOR TRAVEL CONTROL

(71) Applicant: TOYOTA JIDOSHA KABUSHIKI KAISHA, Toyota (JP)

(72) Inventors: Yutaro Tsugawa, Edogawa-ku (JP); Kenichiro Hara, Yokohama (JP); Hiromi Nemoto, Shinagawa-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/695,018

(22) Filed: Mar. 15, 2022

(65) Prior Publication Data

US 2022/0297714 A1     Sep. 22, 2022

(30) Foreign Application Priority Data

Mar. 18, 2021   (JP) ................... 2021-044544

(51) Int. Cl.
| | |
|---|---|
| *B60W 50/14* | (2020.01) |
| *B60W 40/08* | (2012.01) |
| *B60W 30/18* | (2012.01) |
| *G06V 20/59* | (2022.01) |
| *G06V 40/16* | (2022.01) |

(52) U.S. Cl.
CPC ...... *B60W 50/14* (2013.01); *B60W 30/18163* (2013.01); *B60W 40/08* (2013.01); *G06V 20/597* (2022.01); *G06V 40/161* (2022.01); *B60W 2050/143* (2013.01); *B60W 2050/146* (2013.01); *B60W 2420/42* (2013.01); *B60W 2540/225* (2020.02); *B60W 2540/229* (2020.02)

(58) Field of Classification Search
CPC combination set(s) only.
See application file for complete search history.

(56) References Cited

U.S. PATENT DOCUMENTS

| | | | | |
|---|---|---|---|---|
| 10,011,216 | B1* | 7/2018 | Rovik | G06V 40/193 |
| 2010/0131148 | A1* | 5/2010 | Camhi | B60W 40/09 |
| | | | | 701/31.4 |
| 2017/0088165 | A1* | 3/2017 | Raphael | G06V 40/193 |
| 2018/0354517 | A1* | 12/2018 | Banno | B60W 50/12 |
| 2020/0231159 | A1* | 7/2020 | Tsuji | G08G 1/167 |
| 2021/0061300 | A1* | 3/2021 | Adam | B60W 30/12 |
| 2022/0089163 | A1* | 3/2022 | Qiao | B60W 30/12 |

FOREIGN PATENT DOCUMENTS

| | | |
|---|---|---|
| JP | 2017-102519 A | 6/2017 |
| JP | 2020-033013 A | 3/2020 |
| JP | 2020-114699 A | 7/2020 |
| JP | 2020-135195 A | 8/2020 |

* cited by examiner

*Primary Examiner* — Thomas S McCormack
(74) *Attorney, Agent, or Firm* — Oliff PLC

(57) ABSTRACT

A travel controller detects, from an image representing the face of a driver of a vehicle, an act of the driver checking surroundings of the vehicle, records a time at which the act of checking is detected, and suggests to the driver a lane change for the vehicle to change a travel lane to an adjoining lane. In the case that the act of checking is detected in a precheck period before a suggestion time at which the lane change is suggested, the travel controller makes the vehicle execute the lane change regardless of whether the act of checking is detected in a post-suggestion check period after the suggestion time of the lane change.

6 Claims, 5 Drawing Sheets

TRAVEL CONTROLLER AND METHOD FOR TRAVEL CONTROL

FIELD

The present disclosure relates to a travel controller, a method for travel control, and a travel control program for automatically controlling travel of a vehicle.

BACKGROUND

A known travel controller automatically controls travel of a vehicle, including a lane change (LC), based on surrounding images generated by a camera mounted on the vehicle.

A travel controller described in Japanese Unexamined Patent Publication No. 2017-102519 suggests an LC to a driver, and starts it only if it is determined that the driver has acted to check the safety around the vehicle, i.e., done an act of checking the surroundings (hereafter simply an "act of checking").

SUMMARY

When an LC is suggested after an act of checking, it annoys a driver to be requested to do another act of checking for the LC.

It is an object of the present disclosure to provide a travel controller that can control travel of a vehicle without annoying a driver.

A travel controller according to the present disclosure includes a processor configured to detect, from an image representing the face of a driver of a vehicle, an act of the driver checking surroundings of the vehicle; record a time at which the act of checking is detected; suggest to the driver a lane change for the vehicle to change a travel lane to an adjoining lane; and, in the case that the act of checking is detected in a precheck period before a suggestion time at which the lane change is suggested, make the vehicle execute the lane change regardless of whether the act of checking is detected in a post-suggestion check period after the suggestion time of the lane change.

In the case that the act of checking is not detected in the precheck period, the processor of the travel controller according to the present disclosure in the execution preferably makes the vehicle execute the lane change only if the act of checking is detected in the post-suggestion check period.

Preferably, the processor of the travel controller according to the present disclosure detects, in the detection, a direction to an area near the vehicle checked by the driver in the act of checking, further records, in the recording, the direction of the act of checking, and makes, in the execution, the vehicle execute the lane change in the case that the act of checking such that the recorded direction corresponds to a direction from the travel lane to a target lane is detected in the precheck period.

In the case that the act of checking is detected in the precheck period, the processor of the travel controller according to the present disclosure in the suggestion preferably notifies the driver that a lane change will be executed regardless of whether the act of checking will be detected in the post-suggestion check period.

A method for travel control according to the present disclosure includes detecting, from an image representing the face of a driver of a vehicle, an act of the driver checking surroundings of the vehicle; recording a time at which the act of checking is detected; and suggesting to the driver a lane change for the vehicle to change a travel lane to an adjoining lane. The method further includes, in the case that the act of checking is detected in a precheck period before a suggestion time at which the lane change is suggested, making the vehicle execute the lane change regardless of whether the act of checking is detected in a post-suggestion check period after the suggestion time of the lane change.

A non-transitory computer readable medium having recorded thereon a computer program for travel control according to the present disclosure is provided. The computer program causes a computer to execute a process including detecting, from an image representing the face of a driver of a vehicle, an act of the driver checking surroundings of the vehicle; recording a time at which the act of checking is detected; suggesting to the driver a lane change for the vehicle to change a travel lane to an adjoining lane; and, in the case that the act of checking is detected in a precheck period before a suggestion time at which the lane change is suggested, making the vehicle execute the lane change regardless of whether the act of checking is detected in a post-suggestion check period after the suggestion time of the lane change.

The travel controller according to the present disclosure can control travel of a vehicle without annoying a driver.

DESCRIPTION OF EMBODIMENTS

Hereinafter, a travel controller that can control travel of a vehicle without annoying a driver will be explained in detail with reference to the drawings. From an image representing the face of a driver of a vehicle, the travel controller detects an act of the driver checking surroundings of the vehicle. The travel controller also records a time at which the act of checking is detected, and then suggests to the driver a lane change for the vehicle to change a travel lane to an adjoining lane. In the case that the act of checking is detected in a precheck period before a suggestion time at which the lane change is suggested, the travel controller makes the vehicle execute the lane change regardless of whether the act of checking is detected in a post-suggestion check period after the suggestion time of the lane change.

Figure 1:
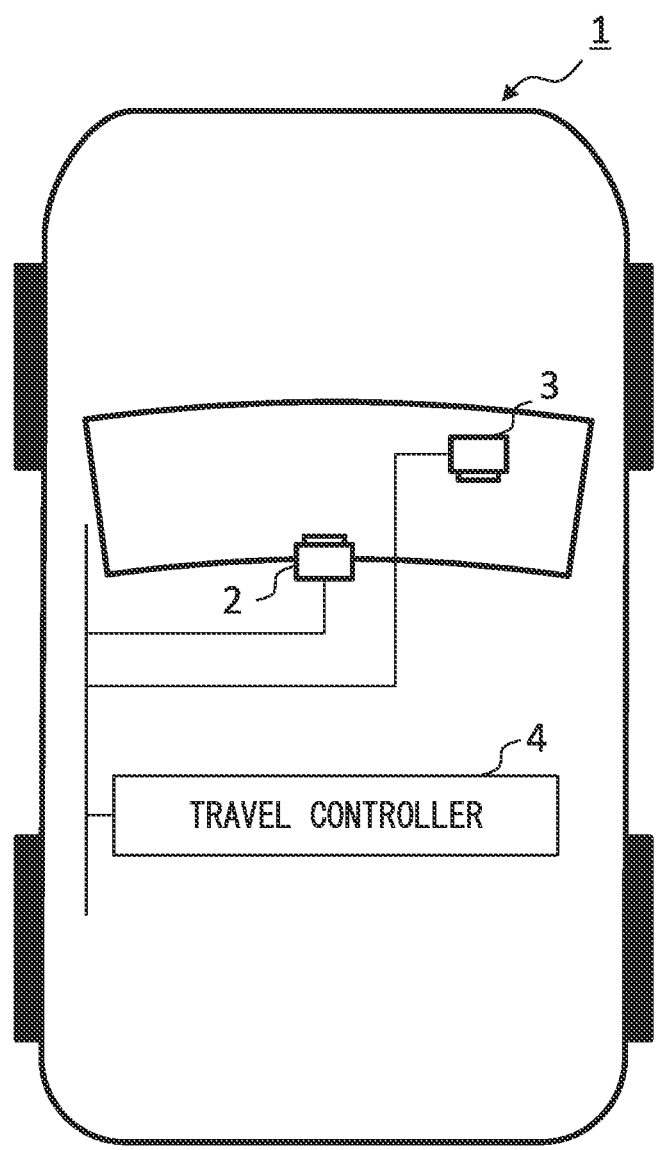
FIG. 1 schematically illustrates the configuration of a vehicle equipped with a travel controller.

FIG. 1 schematically illustrates the configuration of a vehicle equipped with a travel controller.

The vehicle 1 includes a surround capturing camera 2, a driver monitoring camera 3, and a travel controller 4. The surround capturing camera 2 and the driver monitoring camera 3 are connected to the travel controller 4 via an in-vehicle network conforming to a standard, such as a controller area network, so that they can communicate with each other.

The surround capturing camera 2 is an example of a surround capturing unit for generating a surrounding image representing the surroundings of the vehicle. The surround capturing camera 2 includes a two-dimensional detector constructed from an array of optoelectronic transducers, such as CCD or C-MOS, having sensitivity to visible light and a focusing optical system that forms an image of a target region on the two-dimensional detector. The surround capturing camera 2 is disposed, for example, in a front and upper area in the interior of the vehicle and oriented forward, takes a picture of the surroundings of the vehicle 1 through a windshield every predetermined capturing period (e.g., 1/30 to 1/10 seconds), and outputs images representing the surroundings.

The driver monitoring camera 3 is an example of a driver capturing unit for generating a face image representing a face region of the driver of the vehicle. The driver monitoring camera 3 includes a two-dimensional detector constructed from an array of optoelectronic transducers, such as CCD or C-MOS, having sensitivity to infrared light, a focusing optical system that forms an image of a target region on the two-dimensional detector, and a light source that emits infrared light. The driver monitoring camera 3 is mounted, for example, in a front area in the interior of the vehicle and oriented toward the face of the driver sitting on the driver's seat. The driver monitoring camera 3 irradiates the driver with infrared light every predetermined capturing period (e.g. 1/30 to 1/10 seconds), and outputs an image showing the driver's face.

The travel controller 4 is an electronic control unit (ECU) including a communication interface, a memory, and a processor. The travel controller 4 outputs control signals to a travel mechanism (not shown) of the vehicle 1, including an engine, brakes, and steering, so as to satisfy predetermined safety standards, and thereby executes automated driving control of the vehicle 1. Additionally, the travel controller 4 detects the driver's act of checking from face images received via the communication interface from the driver monitoring camera 3, records the time at which the act of checking is detected, and controls a lane change of the vehicle 1, depending on the detection time of the act of checking.

Figure 2:
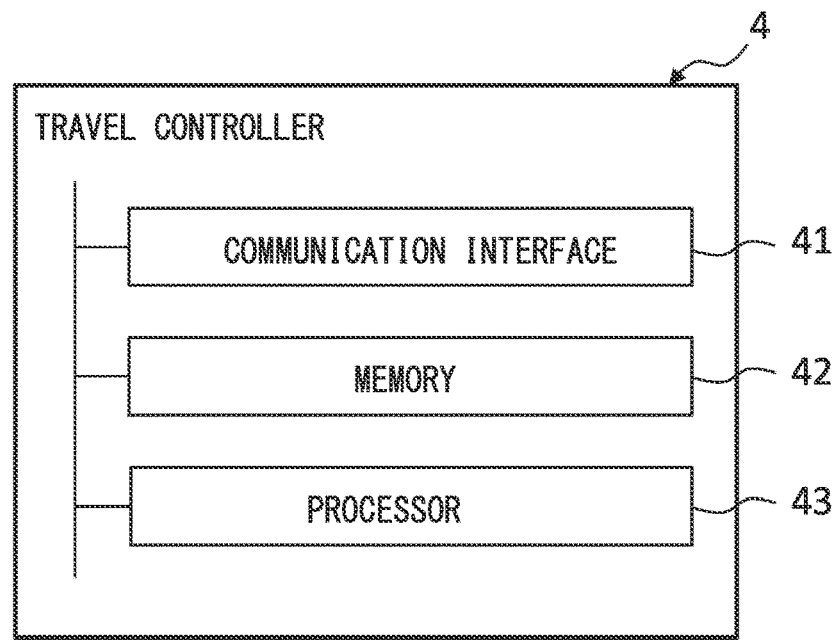
FIG. 2 schematically illustrates the hardware of the travel controller.

FIG. 2 schematically illustrates the hardware of the travel controller 4. The travel controller 4 includes a communication interface 41, a memory 42, and a processor 43.

The communication interface 41 is an example of a communication unit, and includes a communication interface circuit for connecting the travel controller 4 to the in-vehicle network. The communication interface 41 provides received data for the processor 43, and outputs data provided from the processor 43 to an external device.

The memory 42 is an example of a storage unit, and includes volatile and nonvolatile semiconductor memories. The memory 42 contains various types of data used for processing by the processor 43, such as conditions for detecting the act of checking from a face image, a set of parameters for defining a neural network that functions as an object classifier for detecting an object from a surrounding image, and times at which the act of checking is detected. The memory 42 also contains various application programs, such as a travel control program for executing a travel control process.

The processor 43 is an example of a control unit, and includes one or more processors and a peripheral circuit thereof. The processor 43 may further include another operating circuit, such as a logic-arithmetic unit, an arithmetic unit, or a graphics processing unit.

Figure 3:
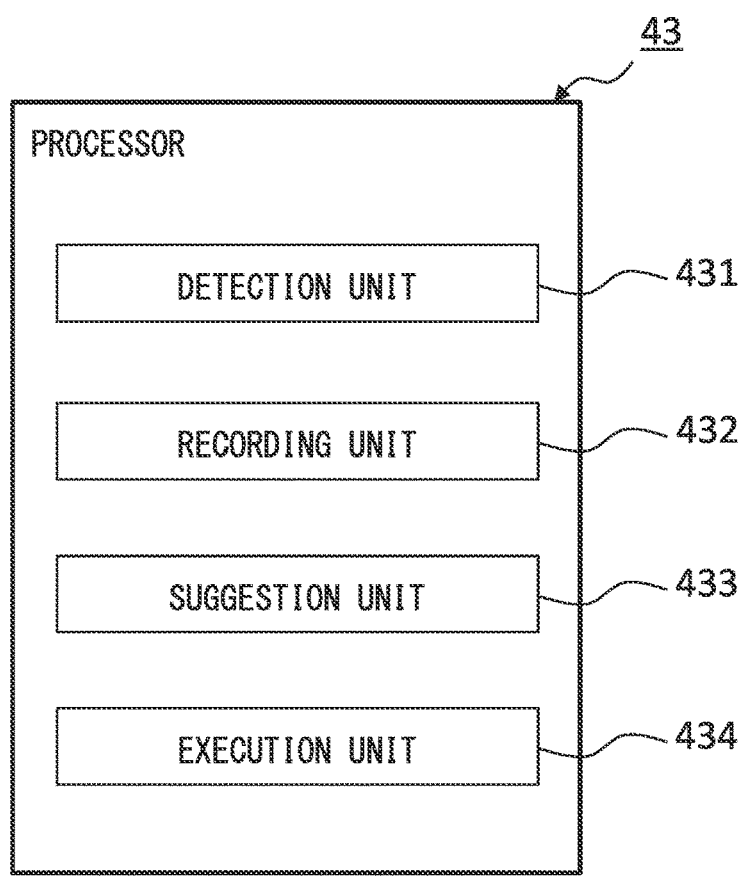
FIG. 3 is a functional block diagram of a processor included in the travel controller.

FIG. 3 is a functional block diagram of the processor 43 included in the travel controller 4.

As its functional blocks, the processor 43 of the travel controller 4 includes a detection unit 431, a recording unit 432, a suggestion unit 433, and an execution unit 434. These units included in the processor 43 are functional modules implemented by a program executed on the processor 43, or may be implemented in the travel controller 4 as separate integrated circuits, microprocessors, or firmware.

The detection unit 431 detects an act of the driver checking surroundings of the vehicle, from a face image received via the communication interface from the driver monitoring camera 3. For example, the detection unit 431 detects pupils and corneal reflection images of a light source by template matching of the face image with templates representing pupils and corneal reflection images of a light source, and detects the looking direction, based on their positional relationship. The looking direction is expressed as a horizontal angle between the travel direction of the vehicle 1 and the direction in which the driver is looking. When the driver's looking direction is toward an area near the vehicle 1 (e.g., forms an angle of 30 degrees or more with the travel direction), the detection unit 431 detects the driver's act of checking.

The detection unit 431 may detect the driver's act of checking when the horizontal angle between the driver's face orientation angle detected from a face image and the travel direction of the vehicle 1 is greater than a predetermined angle threshold. In this case, the detection unit 431 inputs the face image into a facial part classifier that has been trained to detect predetermined facial parts, such as the inner and outer canthi and the corners of the mouth, thereby identifying the positions of the predetermined parts included in the face image. The detection unit 431 further compares the positions of the predetermined parts detected from the face image with a three-dimensional model of a standard face. Then, the detection unit 431 detects the face orientation angle of the three-dimensional model at which the position of each part best fits that of the corresponding part detected from the face image, as the face orientation angle of the face image.

The facial part classifier may be, for example, a convolutional neural network (CNN) including convolution layers connected in series from the input toward the output. A CNN that has been trained using inputted face images as training data functions as a facial part classifier for detecting predetermined facial parts from a face image.

The detection unit 431 detects the looking direction or the face orientation angle as the direction to an area near the vehicle 1 checked by the driver in the act of checking.

The recording unit 432 records the time at which the act of checking is detected in the memory 42. The recording unit 432 may retain data indicating the detection and the detection time in association with each other in the memory 42 for a certain period. For each of the face images received sequentially from the driver monitoring camera 3, the recording unit 432 may record the time of capturing and whether the act of checking is detected in association with each other in the memory 42. The recording unit 432 may further record the direction of the act of checking.

The suggestion unit 433 suggests to the driver a lane change for the vehicle 1 to change a travel lane to an adjoining lane. The suggestion unit 433 generates a trajectory for a lane change, and causes an image representing a suggestion of a lane change to appear, for example, on a meter display (not shown) connected via the communication interface 41. The image representing a suggestion of a lane change includes, for example, a text string, such as "a lane change is expected," or a figure representing a trajectory from the current lane to an adjoining lane. The suggestion unit 433 may further play back a voice suggesting a lane change, for example, with a speaker (not shown) connected via the communication interface 41.

The suggestion unit 433 determines whether the situation requires a lane change, and suggests a lane change when it is determined that the situation requires a lane change. For example, from a surrounding image received via the communication interface 41 from the surround capturing camera 2, the suggestion unit 433 detects lane lines on the road being traveled by the vehicle 1 and another vehicle traveling near the vehicle 1. For example, in the case that the interval between the vehicle 1 and another vehicle traveling ahead on the travel lane of the vehicle 1 is gradually decreased below an interval threshold, the suggestion unit 433 suggests to the driver a lane change to an adjoining lane.

Additionally, the suggestion unit 433 suggests a lane change before a position where a lane change is required to travel along a predetermined trajectory (e.g., to a branch road).

The suggestion unit 433 may further notify to the driver whether the suggested lane change will be executed by the execution unit 434. For example, the suggestion unit 433 causes an image including a text string, such as "the lane change will be made" or "the lane change has been canceled," to appear on the meter display. Additionally, the suggestion unit 433 may play back a voice saying "the lane change will be made" or "the lane change has been canceled" with the speaker.

The execution unit 434 makes the vehicle 1 execute the lane change regardless of whether the act of checking is detected in a post-suggestion check period in the case that the act of checking is detected in a precheck period. The precheck period is a predetermined length of time (e.g., 5 seconds) before the time at which the lane change is suggested, and may be a period from a predetermined earlier time to the suggestion time of the lane change. The post-suggestion check period is a predetermined length of time (e.g., 5 seconds) after the suggestion time of the lane change, and may be a period from the suggestion time of the lane change to a predetermined later time. The precheck period and the post-suggestion check period may have different lengths.

The execution unit 434 outputs control signals to the travel mechanism (not shown) of the vehicle 1 via the communication interface 41 so that the vehicle 1 will travel along the trajectory for the lane change. The travel mechanism includes, for example, an engine or a motor for supplying motive power to the vehicle 1, brakes for decreasing the travel speed of the vehicle 1, and a steering mechanism for steering the vehicle 1.

In the case that the act of checking is not detected in the precheck period, the execution unit 434 may make the vehicle 1 execute the lane change only if the act of checking is detected in the post-suggestion check period.

The execution unit 434 may determine whether the direction of the act of checking detected in the precheck period corresponds to the direction from the current travel lane of the vehicle 1 to the target lane. In this case, the execution unit 434 makes the vehicle 1 execute the lane change when the angle between the direction of the act of checking and the direction from the current travel lane of the vehicle 1 to the target lane is less than a predetermined angle threshold. The execution unit 434 does not make the vehicle 1 execute the lane change when the direction of the act of checking is not the direction from the current travel lane of the vehicle 1 to the target lane.

Figure 4:
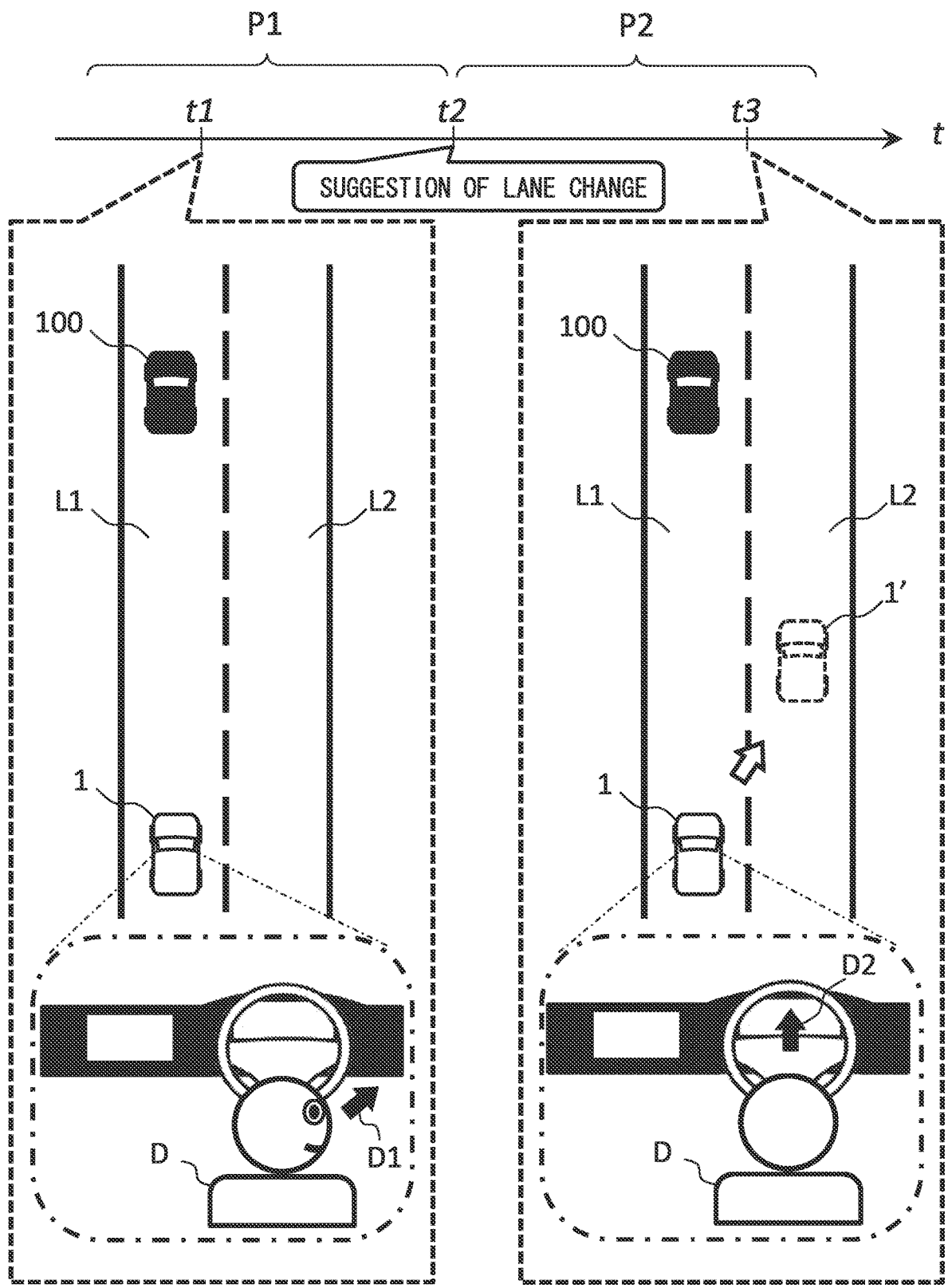
FIG. 4 is a schematic diagram for outlining travel control.

FIG. 4 is a schematic diagram for outlining travel control.

In FIG. 4, the suggestion unit 433 suggests a lane change at time t2. Time t1 is included in a precheck period P1 before time t2 whereas time t3 is included in a post-suggestion check period P2 after time t2.

At time t1, the vehicle 1 and another vehicle 100 are traveling on a lane L1. At time t1, the driver D of the vehicle 1 is looking in a direction D1 from the lane L1 to an adjoining lane L2. The detection unit 431 detects the driver's act of checking in the precheck period P1.

At time t3, the vehicle 1 and the other vehicle 100 are traveling on the lane L1. At time t3, the driver D of the vehicle 1 is looking in a direction D2 to the front in the lane L1. The detection unit 431 does not detect the driver's act of checking in the post-suggestion check period P2.

Since the act of checking is detected in the precheck period P1, the execution unit 434 makes the vehicle 1 execute the lane change toward a future position 1' regardless of whether the act of checking is detected in the post-suggestion check period.

Figure 5:
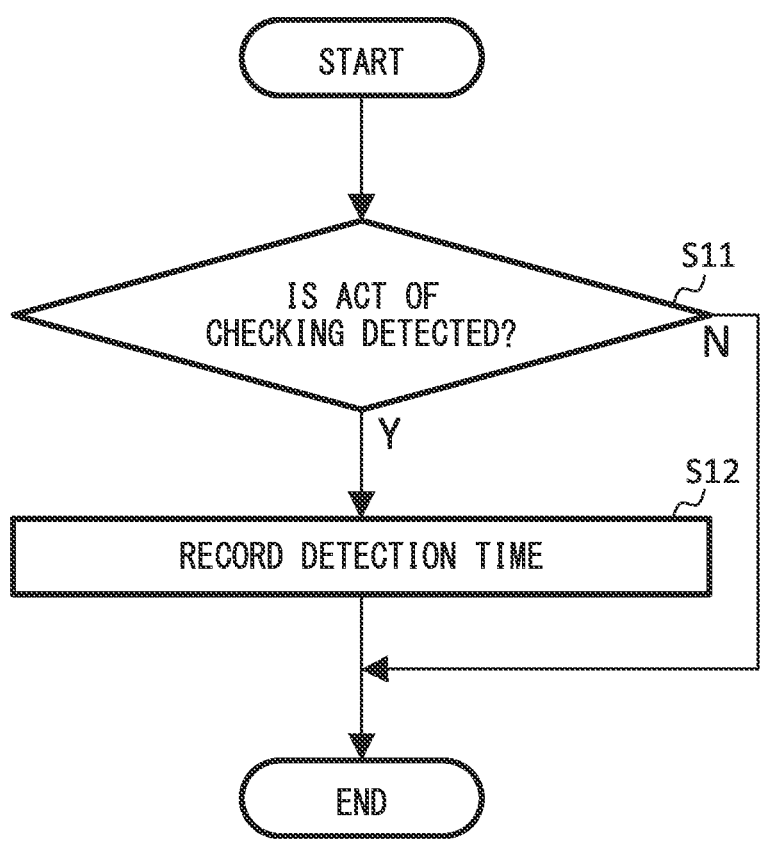
FIG. 5 is a flowchart of a first travel control process.

FIG. 5 is a flowchart of a first travel control process. The travel controller 4 repeats the first travel control process at predetermined intervals (e.g., intervals of 1/10 seconds) during travel of the vehicle 1.

First, the detection unit 431 of the travel controller 4 detects the act of checking from a face image generated by the driver monitoring camera 3 (step S11).

When the act of checking is detected (Yes in Step S11), the recording unit 432 of the travel controller 4 records the time at which the act of checking is detected (step S12), and terminates the first travel control process. When no act of checking is detected (No in Step S11), the detection unit 431 of the travel controller 4 terminates the first travel control process without recording the detection time of an act of checking.

Figure 6:
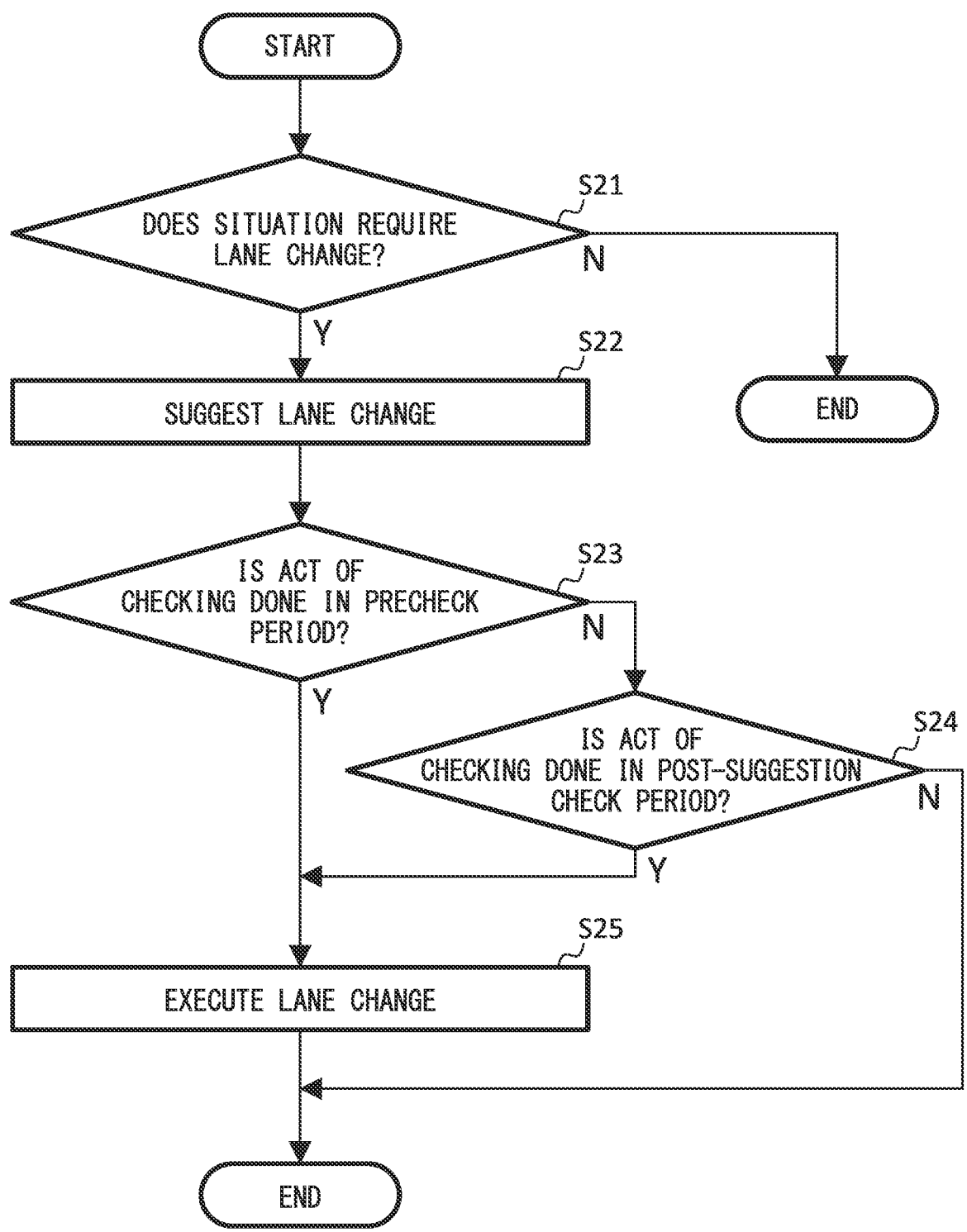
FIG. 6 is a flowchart of a second travel control process.

FIG. 6 is a flowchart of a second travel control process. The travel controller 4 repeats the second travel control process at predetermined intervals (e.g., intervals of 1/10 seconds) during travel of the vehicle 1 under automated driving control.

The suggestion unit 433 of the travel controller 4 determines whether the situation requires a lane change (step S21), and terminates the second travel control process when it is determined that the situation does not require a lane change (No in Step S21).

When it is determined that the situation requires a lane change (Yes in Step S21), the suggestion unit 433 suggests a lane change (step S22).

Next, the execution unit 434 determines whether the act of checking is detected in the precheck period (step S23). When it is determined that no act of checking is detected in the precheck period (No in Step S23), the execution unit 434 determines whether the act of checking is detected in the post-suggestion check period (step S24). When it is determined that no act of checking is detected in the post-suggestion check period (No in Step S24), the execution unit 434 terminates the second travel control process.

When it is determined that the act of checking is detected in the precheck period (Yes in Step S23) or that the act of checking is detected in the post-suggestion check period (Yes in Step S24), the execution unit 434 executes the lane change (step S25) and terminates the second travel control process.

When it is determined that the act of checking is detected in the precheck period (Yes in Step S23), the execution unit 434 may notify the driver that a lane change will be executed, before the execution thereof (step S25), regardless of whether the act of checking will be detected in the post-suggestion check period.

The execution of the first and second travel control processes enables the travel controller 4 to control travel of a vehicle without annoying a driver.

According to a modified example, the execution unit 434 detects whether there is a change in the circumstances due to, for example, detection of a new vehicle after the suggestion of a lane change, from a surrounding image received from the surround capturing camera 2. When a change in the circumstances is detected after the suggestion of a lane change, the execution unit 434 does not execute the lane change even if the act of checking is detected in the precheck period. In this case, the suggestion unit 433 may instruct the driver to do the act of checking.

According to another modified example, the suggestion unit 433 sets the precheck period to be longer at suggesting a lane change in a situation that safety does not change over time than at suggesting a lane change in a situation that safety changes over time. A lane change in a situation that safety does not change over time is, for example, one to a branch road where a vehicle behind will not approach. A lane change in a situation that safety changes over time is, for example, one to a passing lane where a vehicle behind may approach.

According to still another modified example, the suggestion unit 433 detects the number of surrounding vehicles from a surrounding image received from the surround capturing camera 2. Then, the suggestion unit 433 sets the precheck period at suggesting a lane change to be shorter as the number of vehicles is larger.

Note that those skilled in the art can apply various changes, substitutions, and modifications without departing from the spirit and scope of the present disclosure.

What is claimed is:

1. A travel controller comprising a processor configured to
   detect, from an image representing the face of a driver of a vehicle, an act of the driver checking surroundings of the vehicle;
   record a time at which the act of checking is detected;
   suggest to the driver a lane change for the vehicle to change a travel lane to an adjoining lane; and,
   in the case that the act of checking is detected in a precheck period before a suggestion time at which the lane change is suggested, make the vehicle execute the lane change regardless of whether the act of checking is detected in a post-suggestion check period after the suggestion time of the lane change.

2. The travel controller according to claim 1, wherein in the case that the act of checking is not detected in the precheck period, the processor in the execution makes the vehicle execute the lane change only if the act of checking is detected in the post-suggestion check period.

3. The travel controller according to claim 1, wherein the processor
   in the detection detects a direction to an area near the vehicle checked by the driver in the act of checking,
   in the recording further records the direction of the act of checking, and
   in the execution makes the vehicle execute the lane change in the case that the act of checking such that the recorded direction corresponds to a direction from the travel lane to a target lane is detected in the precheck period.

4. The travel controller according to claim 1, wherein in the case that the act of checking is detected in the precheck period, the processor in the suggestion notifies the driver that a lane change will be executed regardless of whether the act of checking will be detected in the post-suggestion check period.

5. A method for travel control, comprising:
   detecting, from an image representing the face of a driver of a vehicle, an act of the driver checking surroundings of the vehicle;
   recording a time at which the act of checking is detected;
   suggesting to the driver a lane change for the vehicle to change a travel lane to an adjoining lane; and,
   in the case that the act of checking is detected in a precheck period before a suggestion time at which the lane change is suggested, making the vehicle execute the lane change regardless of whether the act of checking is detected in a post-suggestion check period after the suggestion time of the lane change.

6. A non-transitory computer readable medium having recorded thereon a computer program for travel control, the computer program causing a computer to execute a process comprising:
   detecting, from an image representing the face of a driver of a vehicle, an act of the driver checking surroundings of the vehicle;
   recording a time at which the act of checking is detected;
   suggesting to the driver a lane change for the vehicle to change a travel lane to an adjoining lane; and,
   in the case that the act of checking is detected in a precheck period before a suggestion time at which the lane change is suggested, making the vehicle execute the lane change regardless of whether the act of checking is detected in a post-suggestion check period after the suggestion time of the lane change.

* * * * *